(12) United States Patent
Alexandre

(10) Patent No.: US 11,219,157 B2
(45) Date of Patent: Jan. 11, 2022

(54) DEVICE FOR CLEANING ROOT VEGETABLES AND AGRICULTURAL MACHINE EQUIPPED WITH SUCH A DEVICE

(71) Applicant: Eric Alexandre, Clerlande (FR)

(72) Inventor: Eric Alexandre, Clerlande (FR)

(*) Notice: Subject to any disclaimer, the term of this patent is extended or adjusted under 35 U.S.C. 154(b) by 121 days.

(21) Appl. No.: 16/608,299

(22) PCT Filed: Apr. 23, 2018

(86) PCT No.: PCT/FR2018/000096
§ 371 (c)(1),
(2) Date: Oct. 25, 2019

(87) PCT Pub. No.: WO2018/197761
PCT Pub. Date: Nov. 1, 2018

(65) Prior Publication Data
US 2020/0077578 A1  Mar. 12, 2020

(30) Foreign Application Priority Data

Apr. 28, 2017  (FR) .................................. 1753736

(51) Int. Cl.
*A01D 17/06* (2006.01)
*A23N 12/00* (2006.01)

(52) U.S. Cl.
CPC ........... *A01D 17/06* (2013.01); *A23N 12/005* (2013.01)

(58) Field of Classification Search
CPC ........ A01D 17/06; A01D 21/00; A01D 13/00; A01D 33/08; A01D 41/133; A23N 12/005
See application file for complete search history.

(56) References Cited

U.S. PATENT DOCUMENTS

| | | | | |
|---|---|---|---|---|
| 2,861,686 A * | 11/1958 | Johnson | ................... | A01D 33/04 209/690 |
| 3,651,922 A * | 3/1972 | Ross | ................... | B65G 69/165 198/457.07 |
| 4,889,045 A * | 12/1989 | Backus | ................... | A23N 15/08 99/546 |
| 4,912,914 A * | 4/1990 | Wingard | ............... | A01D 43/003 56/16.4 B |
| 5,105,563 A * | 4/1992 | Fingerson | ............ | A01D 43/003 34/203 |
| 7,051,505 B2 * | 5/2006 | Brannstrom | ......... | A01D 45/006 460/133 |

(Continued)

OTHER PUBLICATIONS

English Translation of Written Opinion of the International Searching Authority for PCT/FR2018/000096 filed Apr. 23, 2018.

*Primary Examiner* — Jessica H Lutz

(57) ABSTRACT

A device for cleaning root vegetables include at least two rollers each rotatably mounted about an axis perpendicular to a direction of travel of the root vegetables on the rollers. At least one of the rollers is equipped with a means for heating its outer wall. Thus, with the outer wall of the roller being heated, this has the effect of drying soil that is possibly stuck thereon. This drying is enough to make the soil crisp and to overcome the suction phenomenon of wet soil on the roller and on reliefs of the roller. Vibrations due to the displacement of the root vegetables on the rollers ensure that the dried soil is detached and falls to the ground.

14 Claims, 3 Drawing Sheets

(56) References Cited

U.S. PATENT DOCUMENTS

| | | | |
|---|---|---|---|
| 2005/0219943 A1* | 10/2005 | Yamane | B29B 7/489 366/77 |
| 2007/0000823 A1* | 1/2007 | Greenbank | B07B 1/15 209/621 |
| 2009/0104953 A1* | 4/2009 | Kalverkamp | A01D 33/08 460/123 |
| 2010/0040412 A1* | 2/2010 | Fickeisen | E01C 19/48 404/108 |
| 2010/0096301 A1* | 4/2010 | Nyborg | B07B 13/10 209/667 |

* cited by examiner

DEVICE FOR CLEANING ROOT VEGETABLES AND AGRICULTURAL MACHINE EQUIPPED WITH SUCH A DEVICE

CROSS-REFERENCE TO RELATED APPLICATIONS

The present application is a national stage entry of International Patent Application No. PCT/FR2018/000096, filed on Apr. 23, 2018, which claims priority to French Patent Application No. 1753736, filed on Apr. 28, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to a root vegetable cleaning device and an agricultural machine equipped with such a device.

Brief Discussion of Related Art

Root vegetables are plants having a useful part, which is used for human food or animal feed, or for industrial, cosmetic, chemical, pharmaceutical or other uses, found naturally in the soil. By way of non-limiting examples, sugar or red fodder beet, carrots, potatoes, sweet potatoes, yams, cassava, peanuts, onions or any other vegetable having an edible part that is underground and requires uprooting of the vegetable can be cited. Subsequently, for greater clarity, the invention will be described with reference to the harvesting of beets.

When harvesting root vegetables, the soil covering them needs to be removed by as much as possible. This soil, particularly in the rainy season, adheres to the vegetables all the more easily as they have rootlets and/or folds favoring the retention of wet, therefore sticky, soil on the vegetable. Because these vegetables must, firstly, be as clean as possible before any processing and, on the other hand, the vegetables are usually paid for by the "clean" weight, it is important that the producer removes the maximum amount of soil as soon as possible.

To this end, various devices exist that are generally associated with harvesting machines. Wire mesh belts, which are vibrating and/or have deflectors creating a barriered route, or claws are thus arranged between the harvesting bar that digs up the vegetables and the zone for receiving root vegetables on the harvesting machine.

Another device that is employed comprises a plurality of counter-rotating rollers provided with reliefs arranged as a spiral on the peripheries thereof. The rotation of these rollers ensures that the vegetables are transferred while being shaken, which encourages soil removal, which soil falls to the ground between the rollers. Document US-A-2009/0104953 discloses such rollers. Other devices are based on a variant of such rollers provided with an Archimedes screw, as disclosed in FR-A-3028712 or U.S. Pat. No. 3,771,651. While these devices are completely satisfactory when the soil is dry or is at least slightly wet, it has been found that when the soil is sticky and heavy, it accumulates between the turns of the reliefs on each roller and between the rollers. This then results in an accumulation of soil both on and between the rollers, which can even result in the rollers becoming rotationally blocked. Such blocking can result in the breakage of a rotational drive part, for example, a belt, or the breakage of one or more rollers. Moreover, even if the rollers turn, while the spaces between the turns of the reliefs are clogged up, the reliefs no longer scrape the vegetables, and the soil remains on the vegetables. This phenomenon of sticky soil is particularly observed with sedimentary and/or clayey soils that are encountered in certain agricultural areas and are known as rich soils.

SUMMARY OF THE INVENTION

It is these drawbacks that the invention more particularly intends to remedy by proposing a device for cleaning root vegetables during their harvest, usable in all circumstances, whether or not the soil is heavy and sticky.

For this purpose, the subject matter of the invention is a device for cleaning root vegetables comprising at least two rollers rotatably mounted about an axis, characterized in that at least one of the rollers is equipped with a means for heating its outer wall.

Thus, with the outer wall of the roller being heated, this has the effect of drying the soil that may be stuck on the roller, at least to a thickness of a few millimeters. This drying is enough to make the soil crisp and to overcome the suction phenomenon of the wet soil on the roller and on the reliefs of the roller. The vibrations due to the displacement of the vegetables on the rollers ensure that the soil thus dried is detached and cause it to fall to the ground. In other words, at least one, and preferably all, of the rollers is/are kept, under all circumstances, even if it is not clean, at least covered with a minimum amount of soil, so as to ensure that vegetables are transferred and cleaned under all circumstances, without clogging up the space between the rollers.

According to advantageous but non-compulsory aspects of the invention, such a device can comprise one or more of the following features:

- the axis of rotation of the rollers is perpendicular to the direction of travel of the root vegetables on the rollers;
- the axis of rotation of at least some of the rollers is parallel to the direction of travel of the root vegetables on the rollers;
- the axes of rotation of at least two adjacent rollers are parallel;
- the axes of rotation of at least two adjacent rollers are not parallel;
- adjacent rollers having non-parallel axes of rotation are conical, with a constant spacing between the rollers, along the length of the rollers;

the heating means comprise a component for heating a heat transfer fluid circulating in a closed circuit in the internal volume of at least one roller, between the ends thereof;

all the rollers receive a heat transfer fluid circulating in their internal volumes, between the ends of the rollers;

the cleaning device comprises, in addition to the rollers, at least one conveyor belt and rotary claws, at least one of these elements is also provided with a heating means;

the heating means comprise, as a heating component, at least one electrical resistor equipping one of the constituent elements of the cleaning device;

the heating means comprise, as a heating component, the circulation of hot air on at least one of the constituent elements of the cleaning device;

the means for heating the constituent elements of the cleaning device comprise at least two heating components that are selected from a circulation of heat transfer fluid, a circulation of hot air, an electrical resistor;

at least one roller is equipped on its outer face with at least one hollow rib adapted to receive a heating component selected from a circulation of heat transfer fluid, a circulation of hot air, an electrical resistor.

The invention also relates to an agricultural machine for harvesting root vegetables equipped with a device for cleaning root vegetables according to one of the preceding features.

BRIEF DESCRIPTION OF THE SEVERAL VIEWS OF THE DRAWINGS

The invention will be better understood, and further advantages thereof will become more clearly apparent, upon reading the following description of a plurality of embodiments of the invention, provided by way of a non-limiting example and with reference to the accompanying drawings, in which.

DETAILED DESCRIPTION OF THE INVENTION

Figure 1:
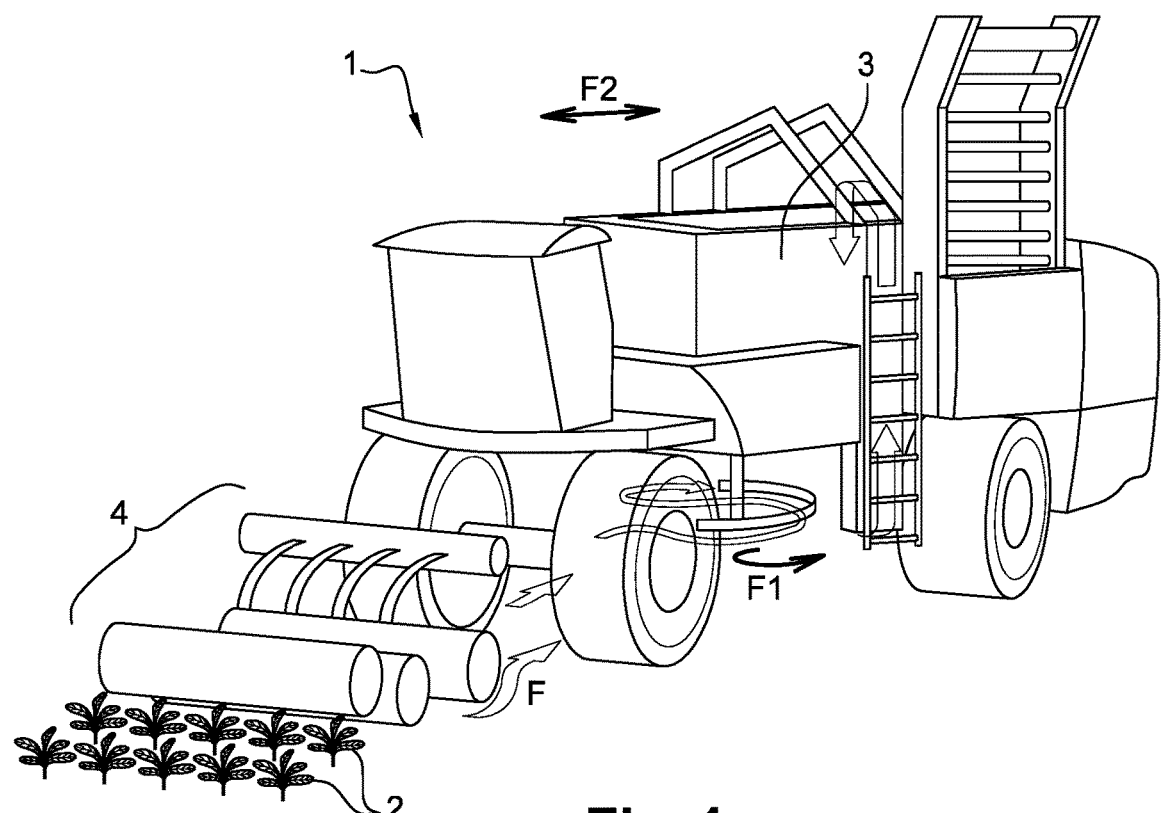
FIG. 1 is a schematic and simplified perspective view of an agricultural machine for harvesting root vegetables equipped with a cleaning device according to one embodiment of the invention.

FIG. 1 schematically illustrates an agricultural machine 1 intended for harvesting root vegetables, for example, beets 2. Hereafter, reference will be made, in a non-limiting manner, to the harvesting of beets, with it being understood that the invention applies to the harvesting of all types of root vegetables, provided that they need to be cleaned prior to any use, processing and/or consumption by animals and/or human beings. Thus, such a machine also relates to the harvesting of potatoes or other root vegetables.

In any case, harvesting root vegetables generally involves an operation of cutting the above ground portion or vegetable leaves and then uprooting the vegetables from the ground, before conveying them to a hopper or temporary storage bin 3, which in this case is located on the agricultural machine 1. When conveyed, the vegetables, in this case beets 2, need to have as much as possible of the soil that remains stuck on the vegetables removed. Indeed, payment of the harvest is predominantly based on the weight of "clean" vegetables, and therefore which are soil free and which are ready to be used or processed. In addition, the presence of soil on the vegetables, in this case on beets, alters the duration and the quality of preservation before processing or use.

In this case, the component, which is per se known, that cuts the above ground portion of the beets 2 and uproots them, is schematically illustrated in FIG. 1 by tubes, reference sign 4.

Once the beets 2, or more generally root vegetables, are uprooted, they are directed, along the arrow F, towards a cleaning device. This cleaning device also, according to a preferred embodiment, conveys the beets 2 towards the storage bin 3, along the arrow F1 in FIG. 1. In other embodiments, not shown, the cleaning device only completes the cleaning function, with the vegetables being conveyed by gravity, for example.

Figure 2:
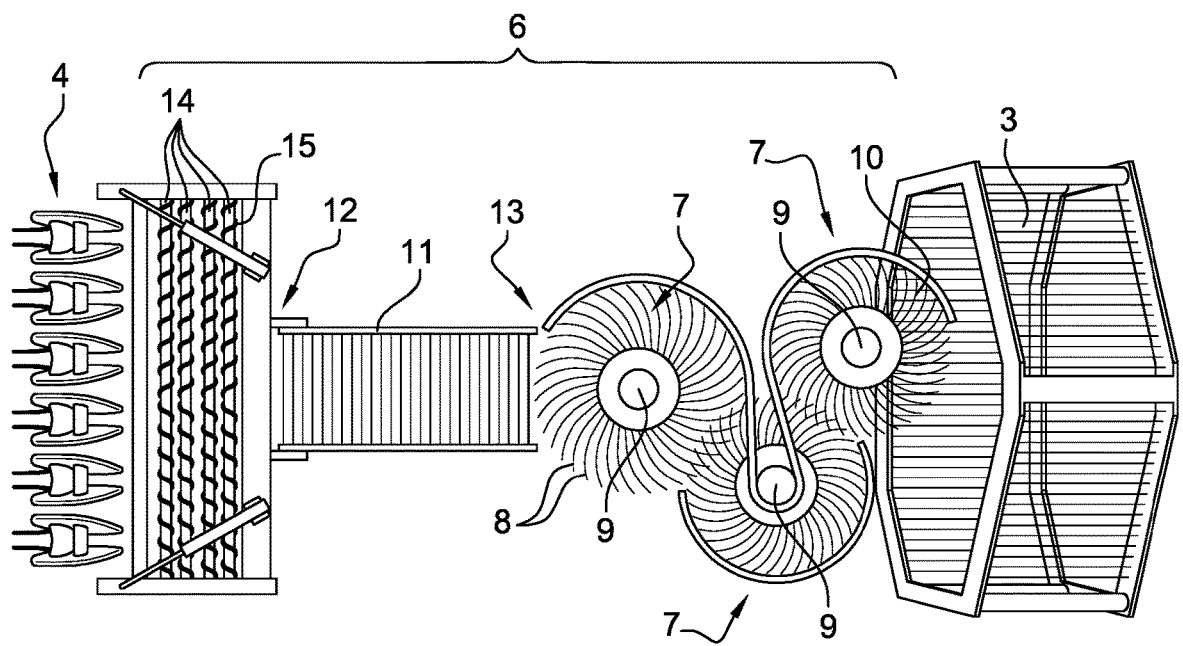
FIG. 2 is a top view illustrating the means for harvesting and transporting root vegetables in the agricultural machine of FIG. 1, with a cleaning device according to one embodiment of the invention.

The cleaning and conveying device, reference sign 6, is particularly shown in FIG. 2. As is apparent from the schematic representation of FIG. 2, the cleaning and conveying device 6 is formed by a plurality of elements. Starting from the right-hand side of FIG. 2, thus from the storage bin 3, the device 6 comprises a series 7 of claws 8. The claws 8 are curved. They are fixed, at one end, to a vertical central shaft 9, around which they are able to rotate. The claws 8 are helically arranged on the shaft 9. In the example, three shafts 9 equipped with series 7 of claws 8 are provided. The claws 8 of each series 7 are arranged so as to move the beets from the claws 8 supported by the shaft 9 farthest from the storage bin 3 to the claws 8 having free ends 10 that are positioned above the storage bin 3, as shown in FIG. 2.

The claws 8 located in the lower part, therefore at the lowest altitude relative to the storage bin 3, are positioned in the extension of a conveyor belt 11. This conveyor belt 11 is openworked. Advantageously, it is formed by bars or a metal mesh. The end 12 of the belt 11, opposite the end 13 facing the claws 8, is located in the extension of the rollers 14. The rollers 14 are cylindrical with a circular base.

As can be seen in FIG. 2, the rollers 14 are positioned behind the cutting and uprooting component 4. In other words, the beets 2, once uprooted, are located on the rollers 14. The rollers 14, due to their position upstream of the beet path towards the hopper 3, form the main cleaning element of the cleaning and conveying device 6. In this case, there are four rollers 14. As a variant, the number thereof is different, with it being understood that the minimum number of rollers 14 is two. In other embodiments, not shown, cleaning rollers are also positioned in the extension of the end 13 of the belt 11, either before the series 7 of claws 8 or as a replacement for them. Such rollers are then oriented with their longitudinal axes parallel to the direction of travel of the agricultural machine 1.

Figure 3:
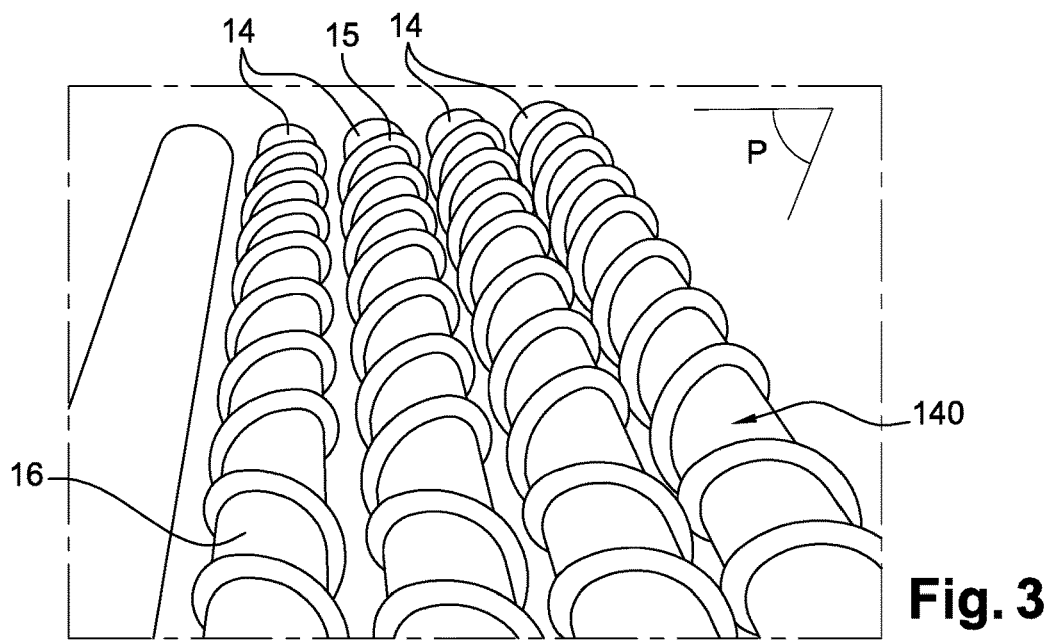
FIG. 3 is a partial view, as a perspective view and to a larger scale, of the cleaning device illustrated in FIG. 2.

The rollers 14 are, in the illustrated advantageous embodiment, each equipped with at least one helical rib 15 on the circumference thereof. As a variant, the circumference of the rollers is provided with other relief components, for example, turns, star-shaped reliefs, parallel ribs or other. The rib 15, which is particularly visible in FIGS. 3 and 5, extends perpendicularly from the outer face 140 of the wall 16 constituting the roller 14 towards the outside, over the entire useful length L14 of each roller 14. The rollers 14 are parallel to each other and are coplanar in a horizontal plane P, substantially parallel to the ground. The rollers 14 are oriented so that their longitudinal axes A are perpendicular to the direction of travel F of the root vegetables on the rollers 14, thus, in the example, perpendicular to the direction of travel of the agricultural machine 1, illustrated by the double arrow F2 in FIG. 1. As a variant, at least some of the rollers have their axes of rotation parallel to the direction of travel of the root vegetables on the rollers.

In other embodiments, not shown, the rollers are arranged angularly. In this case, these rollers are advantageously conical in order to maintain a constant spacing between the rollers.

As is apparent from FIG. 2, a single helical rib 15 equips each roller 14. As a variant, there are several ribs 15 on each roller 14.

Figure 5:
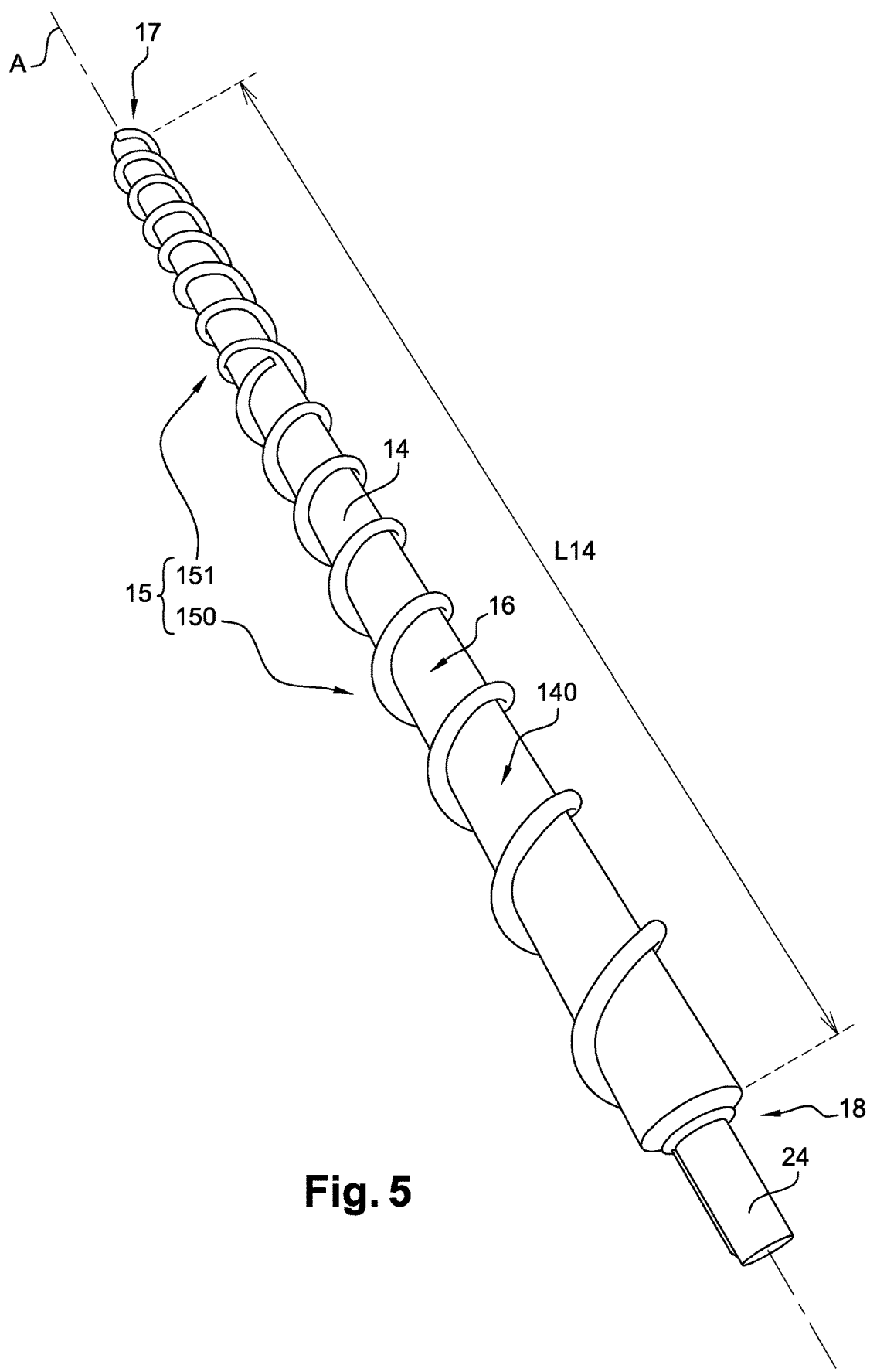
FIG. 5 is a perspective view, to another scale, of a constituent roller of a cleaning device according to the invention.

The rib 15 is, according to an advantageous but non-limiting embodiment illustrated in FIG. 5, divided into two parts 150, 151. The parts 150, 151 are equal and each substantially occupy half the useful length L14 of the roller 14. Each part 150, 151 has a helical pitch oriented in the opposite direction of the other part 151, 150, as is particularly apparent from FIGS. 3 and 5. Thus, each roller 14 is equipped with a rib 15 rotating in the opposite direction of the beet 2 when said beet is driven by the rotation of the roller 14, between the ends 17, 18 of the roller 14. Thus, on the same roller 14, a counter-rotation is completed along the part 150, 151 of the rib 15 on which the beet 2 is located. The effect of this counter-rotation is to generate vibrations such that the beets 2 move on the rollers 14 by jumping on the rollers 14, with the root vegetables also tending to roll on themselves during the movement. These vibration movements and shocks allow the soil present on the beets 2 to be removed, as long as the soil is not too sticky, and therefore wet. This thus enables, due to the configuration of the device 6 and therefore of its constituent elements 7, 11 and 14, an action of scraping the root vegetables to be provided in order to remove the soil covering them.

Such an action is known but proves to be insufficient for obtaining effective cleaning of root vegetables when the soil is fatty and sticky, as is encountered in certain agricultural areas such as, for example, in France, in Eastern Europe, in the North American or South American plains or in China.

Thus, considering the distance separating two adjacent rollers 14 and the presence of the ribs 15, which act as deflectors, the soil not only accumulates on the roller around the rib 15, but also between two adjacent rollers 14. When the soil is fatty and wet, the accumulation of soil is significant and can cause the cleaning device to malfunction. In particular, the ribs 15 no longer fulfill their role of a deflector, with the roller 14 then behaving like a smooth roller. The accumulated soil also enters between the rollers 14 and can limit, and even stop, the rotation of said rollers.

Given the dimensions of the rollers 14, generally between 2 m and 5 m long for an outer diameter ranging from 0.10 m to 0.15 m, with an inter-roller space between 0.04 m and 0.10 m, it is relatively common for rotational blockages of the rollers 14 to be observed when soil accumulates. These blockages are such that, if the drive motor is not immediately stopped, the resistance to the rotation can cause a drive belt and/or at least one roller 14 to break. This is especially common when, in order to limit the weight of the rollers and therefore the power required to rotate them, the rollers 14 are hollow over their entire useful length L14, with a wall thickness 16 between 0.4 mm and 1 mm.

To overcome this issue, the invention allows, if not to completely avoid but at least to limit, rotational blocking of the rollers 14 by decreasing the adhesion of the soil on the rollers 14. To this end, at least one, advantageously all, of the rollers 14 is/are equipped with a means for heating their wall 16, over the entire useful length L14 of the roller 14.

This heating means comprises, in a preferred embodiment, a heating component ensuring the circulation of a heat transfer fluid between the ends 17 and 18 of at least one and, advantageously, of each roller 14. In this case, the heat transfer fluid is a liquid, for example, water, a liquid based on ethylene glycol or propylene, oil or a cooling liquid. As a variant, it is a gas or other liquid.

The circulation of the heat transfer liquid between the ends 17, 18 is carried out at a flow rate, and therefore with a time of passage in the roller 14, that is designed to bring the temperature of the outer face 140 of the wall 16 to at least 50° C. and, preferably, to a temperature between 75° C. and 95° C., preferably around 85° C.

To allow the passage of the heat transfer liquid in the internal volume of each roller 14, two supply ramps, with as many connections, preferably rotary, as necessary are arranged at the ends 17, 18 of the rollers 14. These ramps, which are not illustrated and are per se known, are advantageously fixed to the chassis of the agricultural machine 1. The supply ramps are connected to the ends 17, 18 of the rollers 14.

As is apparent from FIG. 5, the ends 17 and 18 of a roller 14 are each provided with a drive shaft sleeve 24 for rotating the roller. The sleeve 24, the diameter of which is smaller than the diameter of the roller, enters the internal volume of the roller by a few centimeters. A central perforation of the sleeve 24 allows the heat transfer fluid to be introduced into the internal volume of the roller 14.

The circulation of the heat transfer fluid, in a closed circuit, in the rollers between the supply ramps located at the ends 17, 18 of the rollers 14 is completed in a direction that is defined by the heating means manufacturer or installer. It is understood that the circulation can be simple, with the fluid being introduced by one end and discharged by the other end, or that it can be complex: at least one coil is provided in the roller, with the inlet and the outlet of the coil(s) then being completed by the two ends or by only one end. The liquid is circulated by a heating and circulation component 19, which is schematically illustrated in FIG. 4.

This component 19 is connected to a heat transfer fluid reservoir 20 having a volume that is adapted to the number and dimensions of the rollers 14 to be supplied. It involves, for example, a component 19 that is used for the additional heating of a vehicle, typically a camper, a truck or a caravan. It comprises a boiler, either electric or, preferably, thermal and supplied with fuel from either a clean tank or the vehicle tank. By way of an example, heating components 19, such as those marketed by WEBASTO, are known for heating a heat transfer liquid to approximately 85° C., with a flow rate of 1,500 L/H at 5,800 UH and for a power consumption of 60 W to 140 W, depending on the models.

Figure 4:
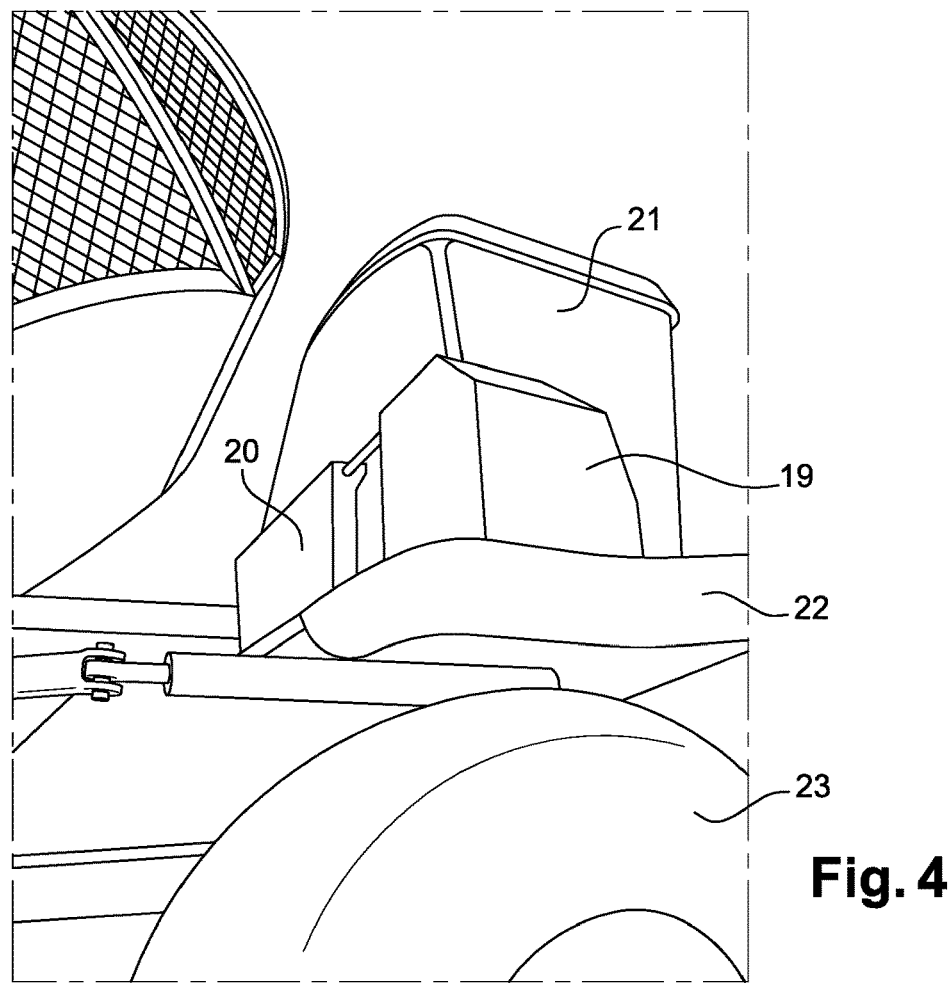
FIG. 4 is a partial view, as a perspective view and to another scale, of another part of the cleaning device.

The component 19 is, in the embodiment illustrated in FIG. 4, installed behind the seat 21 of the driver of the agricultural machine 1, on a fender 22 of a wheel 23. This position at height relative to the rollers 14 and to the distribution ramps, and in the vicinity of these elements, facilitates the gravity feeding of the heat transfer liquid to the rollers 14, while limiting heat losses when the heat transfer liquid circulates between the component 19 and the rollers 14.

It is understood that, as a variant, the arrangement of the component 19 on the agricultural machine 1 is different. In another embodiment, a plurality of heating components 19 is used, possibly of a different type and/or with different powers. Thus, an electrical resistor can be associated with the boiler of the component 19, thereby shortening the heating time of the heat transfer liquid. In addition, a heat transfer fluid filtering device can, as a variant, be fitted on the heating element. As a variant, a filtration device is also provided at the output of the rollers.

The Applicant has found that a temperature of the wall 16 of the rollers 14 that is advantageously close to an optimum of 85° C., allows the soil stuck on the rollers 14 to be dried, at least to a thickness of a few millimeters, generally between 1 mm and 30 mm. This thus creates a non-sticky zone, since the soil is dry. This non-sticky zone of the soil is in the vicinity of the wall 16 of each roller 14, over its entire peripheral surface, thus the entire face 140. The movements, shocks and vibrations due to the displacement of the root vegetables on the rollers 14 cause, through shock, the soil to be broken up and to fall between the rollers, with this being even easier as the adhesion of the soil on the rollers 14 is very weak.

In the embodiment described, the ribs 15 are solid and therefore do not receive heat transfer fluid. As a result, they are at a lower temperature than that of the wall 16 of the roller 14. Nevertheless, this does not allow the soil to regain sufficient adhesion to remain on the roller. In addition, a temperature differential is thus generated between the rib 15 and the wall 16 of the roller 14 supporting it, which causes a thermal gradient in the soil stuck on the roller and facilitates its detachment during the rotation of the rollers.

As a variant, the ribs are also hollow and therefore also receive a heating component, which is identical to that of the roller 14, therefore, in this case, a heat transfer liquid, or is different, for example, an electrical resistor or the circulation of hot air. As a variant, a roller that is provided with a plurality of ribs 15 is equipped with at least one hollow rib adapted to receive a heating means as described above.

As is apparent from FIG. 5, with the ends 17 and 18 of a roller 14 each being provided with a drive sleeve 24, it is possible, by perforating the original sleeves 24 that equip the rollers 14, to modify original rollers 14 to allow the heat transfer liquid to circulate through their internal volume. The heating component 19 can be easily installed on an agricultural machine 1. In other words, the invention can equip, for example, in kit form, an existing agricultural machine as a retrofit.

The Applicant has found that the invention can be implemented regardless of the material constituting the roller. In other words, whether the roller is metallic, is made of polymers or is made of a composite material, setting the temperature of the roller is similar and provides the same advantages as those described. Thus, the invention can equip any type of agricultural machine equipped with rollers, even when the rollers of the same machine are of a different type.

In another embodiment, not shown, the means for heating the cleaning device 6 comprise a circulation of hot air. The heating component that is used to ensure the production of hot air is either a dedicated and independent heating component or is associated with the heating component 19. In this case, the component 19 is adapted to send hot air, typically that resulting from its operation in the case of a thermal boiler, over at least one constituent element of the cleaning component 6, for example, the belt 11 and/or the series 7 of claws 8 and/or the rollers 14.

In other embodiments, not shown, the heating means also comprise at least two different and complementary heating components, namely a circulation of heat transfer fluid and/or an electrical resistor and/or the circulation of hot air. These two heating components are adapted to equip at least one, preferably at least two, constituent elements, namely the rollers 14, the series 7 of claws 8, the belt 11, of the cleaning device 6.

As a variant, a roller 14 is provided with an electrical resistor embedded in the wall of the roller and/or receives a circulation of hot air over its outer face 140.

These embodiments can be associated with one another and with several constituent elements of the cleaning device in order to optimize the temperature setting of the cleaning component 6. Thus, cleaning is optimized by promoting soil removal on all parts of the cleaning component 6 where it is likely to accumulate.

It is understood that the invention is applicable in all cases where a sticky and wet product fixes onto a wall of an element and that this element is a cleaning device. It is understood that such an element must be adapted to be heated in order to result in the detachment of the product. By way of non-limiting examples, the use of a cleaning device according to the invention can be cited in the food industries using pasty products such as creams, mayonnaise, jams or other, in the pharmaceutical industry, in the paint industry, in the treatment of drilling muds or purification plant sludge, among others.

The invention claimed is:

1. A cleaning device (6) for root vegetables (2) comprising at least two rollers (14) for cleaning root vegetables (2), each roller of said at least two rollers rotatably mounted about a respective axis (A), wherein at least one roller of said at least two rollers (14) is equipped with a heating means for heating an outer wall (16) of said at least one roller to dry and displace soil attached to said at least one roller.

2. The cleaning device according to claim 1, wherein each said respective axis (A) of rotation of said at least two rollers (14) is perpendicular to a direction of travel (F) of the root vegetables on said at least two rollers (14).

3. The cleaning device according to claim 1, wherein the respective axis of rotation of at least some of said at least two rollers is parallel to a direction of travel of the root vegetables on said at least two rollers.

4. The cleaning device according to claim 1, wherein respective axes (A) of rotation of at least two adjacent rollers (14) of said at least two rollers are parallel.

5. The cleaning device according to claim 1, wherein respective axes (A) of rotation of at least two adjacent rollers of said at least two rollers are not parallel.

6. The cleaning device according to claim 5, wherein each roller of said at least two adjacent rollers is conical, with a constant spacing between said at least two adjacent rollers along a length of said at least two adjacent rollers.

7. The cleaning device according to claim 1, wherein the heating means comprises a component (19, 20) for heating a heat transfer fluid circulating in a closed circuit in an internal volume between opposing ends of said at least one roller (14).

8. The cleaning device according to claim 7, wherein each roller of said at least two rollers (14) have the closed circuit in the internal volume between the opposing ends of said each roller to receive the heat transfer fluid.

9. The cleaning device according to claim 1, further comprising at least one conveyor belt (11) and rotating (9)

claws (8), wherein at least one of said at least one conveyor belt or said rotating claws is provided with the heating means.

10. The cleaning device according to claim 9, wherein the heating means comprises, as a heating component, at least one electrical resistor equipping one of said at least two rollers, said at least one conveyor belt, or said rotating claws.

11. The cleaning device according to claim 9, wherein the heating means comprises, as a heating component, circulation of hot air on at least one of said at least two rollers, said at least one conveyor belt, and said rotating claws.

12. The cleaning device according to claim 9, wherein the heating means comprises at least two heating components selected from a circulation of heat transfer fluid, a circulation of hot air, and an electrical resistor.

13. The cleaning device according to claim 1, wherein at least one roller (14) of said at least two rollers is equipped on its outer face (140) with at least one hollow rib (15) adapted to receive a heating component selected from a circulation of heat transfer fluid, an electrical resistor, and a circulation of hot air.

14. An agricultural machine (1) for harvesting root vegetables (2) equipped with the cleaning device according to claim 1.

* * * * *